(12) United States Patent  
Geusz et al.

(10) Patent No.: US 11,641,460 B1  
(45) Date of Patent: May 2, 2023

(54) GENERATING A VOLUMETRIC REPRESENTATION OF A CAPTURE REGION

(71) Applicant: Apple Inc., Cupertino, CA (US)

(72) Inventors: Eric John Geusz, San Francisco, CA (US); Pravalika Avvaru, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/234,393

(22) Filed: Apr. 19, 2021

Related U.S. Application Data

(60) Provisional application No. 63/015,992, filed on Apr. 27, 2020.

(51) Int. Cl.
| | |
|---|---|
| *H04N 13/395* | (2018.01) |
| *G06T 19/00* | (2011.01) |
| *G06T 17/10* | (2006.01) |
| *G06F 3/01* | (2006.01) |
| *G06T 7/521* | (2017.01) |

(52) U.S. Cl.
CPC .......... *H04N 13/395* (2018.05); *G06F 3/013* (2013.01); *G06T 7/521* (2017.01); *G06T 17/10* (2013.01); *G06T 19/00* (2013.01); *G06T 2207/10028* (2013.01)

(58) Field of Classification Search
CPC ....... H04N 13/395; G06T 7/521; G06T 17/10; G06T 19/00; G06F 3/013
USPC ......................................................... 345/419
See application file for complete search history.

(56) References Cited

U.S. PATENT DOCUMENTS

| | | | |
|---|---|---|---|
| 10,241,738 B2 | 3/2019 | Meerbeek et al. | |
| 10,796,489 B1 * | 10/2020 | Cordes | ................ H04L 65/4076 |
| 2010/0167248 A1 | 7/2010 | Ryan | |
| 2018/0197624 A1 * | 7/2018 | Robaina | ................... G06F 3/017 |
| 2019/0254754 A1 * | 8/2019 | Johnson | ................. G16H 20/40 |
| 2019/0370994 A1 * | 12/2019 | Norris | ................... G06V 10/462 |
| 2020/0273243 A1 * | 8/2020 | Duffy | ...................... G06T 17/10 |

FOREIGN PATENT DOCUMENTS

WO     2018022523 A1    2/2018

* cited by examiner

*Primary Examiner* — Hai Tao Sun
(74) *Attorney, Agent, or Firm* — Fernando & Partners, LLP

(57) ABSTRACT

A method includes displaying, on a display, a representation of a physical environment and a computer-generated object. The method includes generating a three-dimensional (3D) point cloud associated with the representation of the physical environment. The method includes obtaining depth information characterizing the physical environment. The method includes obtaining a capture event associated with a capture region within the representation of the physical environment. The capture region includes a portion of the computer-generated object. The method includes, in response to obtaining the capture event, disambiguating a group of points from the 3D point cloud, and generating, based on a function of the depth information and the group of points, a volumetric representation of the capture region. The group of points satisfies a spatial threshold with respect to the capture region. The volumetric representation includes a volumetric representation of the portion of the computer-generated object.

20 Claims, 17 Drawing Sheets

GENERATING A VOLUMETRIC REPRESENTATION OF A CAPTURE REGION

CROSS-REFERENCE TO RELATED APPLICATION

This application claims priority to U.S. Provisional Patent App. No. 63/015,992, filed on Apr. 27, 2020, which is hereby incorporated by reference in its entirety.

TECHNICAL FIELD

The present disclosure relates to generating a volumetric representation, and, in particular, generating a volumetric representation of a capture region.

BACKGROUND

A system may be configured to perform a two-dimensional (2D) capture of displayed content. For example, a computing system enables a user to capture a screenshot of currently displayed content on a computer display. As another example, an image sensor captures a physical environment, such as via a camera application running on a mobile phone. However, current systems lack a mechanism for capturing a three-dimensional (3D) portion of an environment.

SUMMARY

In accordance with some implementations, a method is performed at an electronic device with one or more processors, a non-transitory memory, and a display. The method includes displaying, on the display, a representation of a physical environment and a computer-generated object. The method includes generating a three-dimensional (3D) point cloud associated with the representation of the physical environment. The method includes obtaining depth information characterizing the physical environment. The method includes obtaining a capture event associated with a capture region within the representation of the physical environment. The capture region includes a portion of the computer-generated object. The method includes, in response to obtaining the capture event, disambiguating a group of points from the 3D point cloud, and generating, based on a function of the depth information and the group of points, a volumetric representation of the capture region. The group of points satisfies a spatial threshold with respect to the capture region. The volumetric representation includes a volumetric representation of the portion of the computer-generated object.

In accordance with some implementations, an electronic device includes one or more processors, a non-transitory memory, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
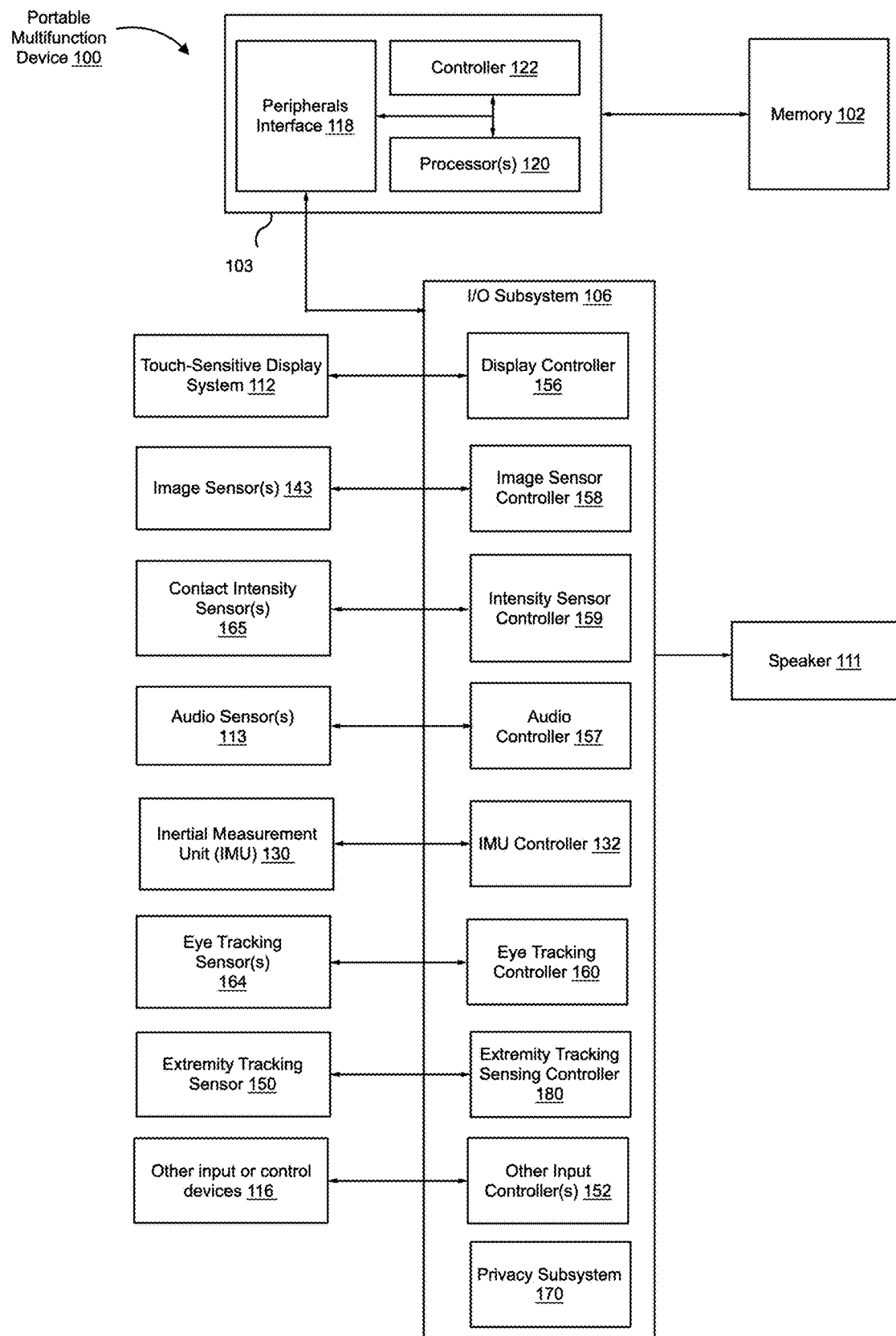
FIG. 1 is a block diagram of an example of a portable multifunction device in accordance with some implementations.

Different systems may capture currently displayed content. For example, a computing system may capture a screenshot of content displayed on a display, such as a laptop display, desktop display, mobile device display, etc. Screenshot content is associated with an application window and/or an operating system (OS) interface (e.g., dock, desktop, etc.). For example, a screenshot may capture a portion of a desktop and a portion of a word processing application window. As another example, an image sensor system captures a portion of a physical environment, such as via a camera application running on a mobile phone. These systems capture the displayed content as a two-dimensional (2D) image or a sequence of 2D images (e.g., a video stream). However, these systems lack a mechanism for capturing a three-dimensional (3D) portion of an environment, such as a 3D representation of an environment that includes a physical object and a computer-generated object.

By contrast, various implementations disclosed herein include methods, electronic devices, and systems for generating a volumetric (e.g., 3D) representation of a capture region associated with a representation of a physical environment and a computer-generated object. To that end, a method includes obtaining depth information and a 3D point cloud associated with the representation of a physical environment. The method includes obtaining a capture event associated with a capture region. For example, the capture event corresponds to a user input directed to the capture region within the representation of the physical environment. As another example, obtaining the capture event includes determining a threshold amount of scene change, such as change with respect to a physical object, a computer-generated object, or a combination thereof. The scene change may have a spatial relationship to the capture region. In response to obtaining the capture event, the method includes disambiguating a group of points from the 3D point cloud. The group of points has a spatial relationship to the capture region. Moreover, the method includes generating the volumetric representation of the capture region based on the group of points and the depth information.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment. In some implementations, the other input or control devices 116 include a depth sensor and/or a time of flight sensor that obtains depth information characterizing a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within an XR environment. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2M are examples of generating volumetric representations of corresponding capture regions in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 2A:
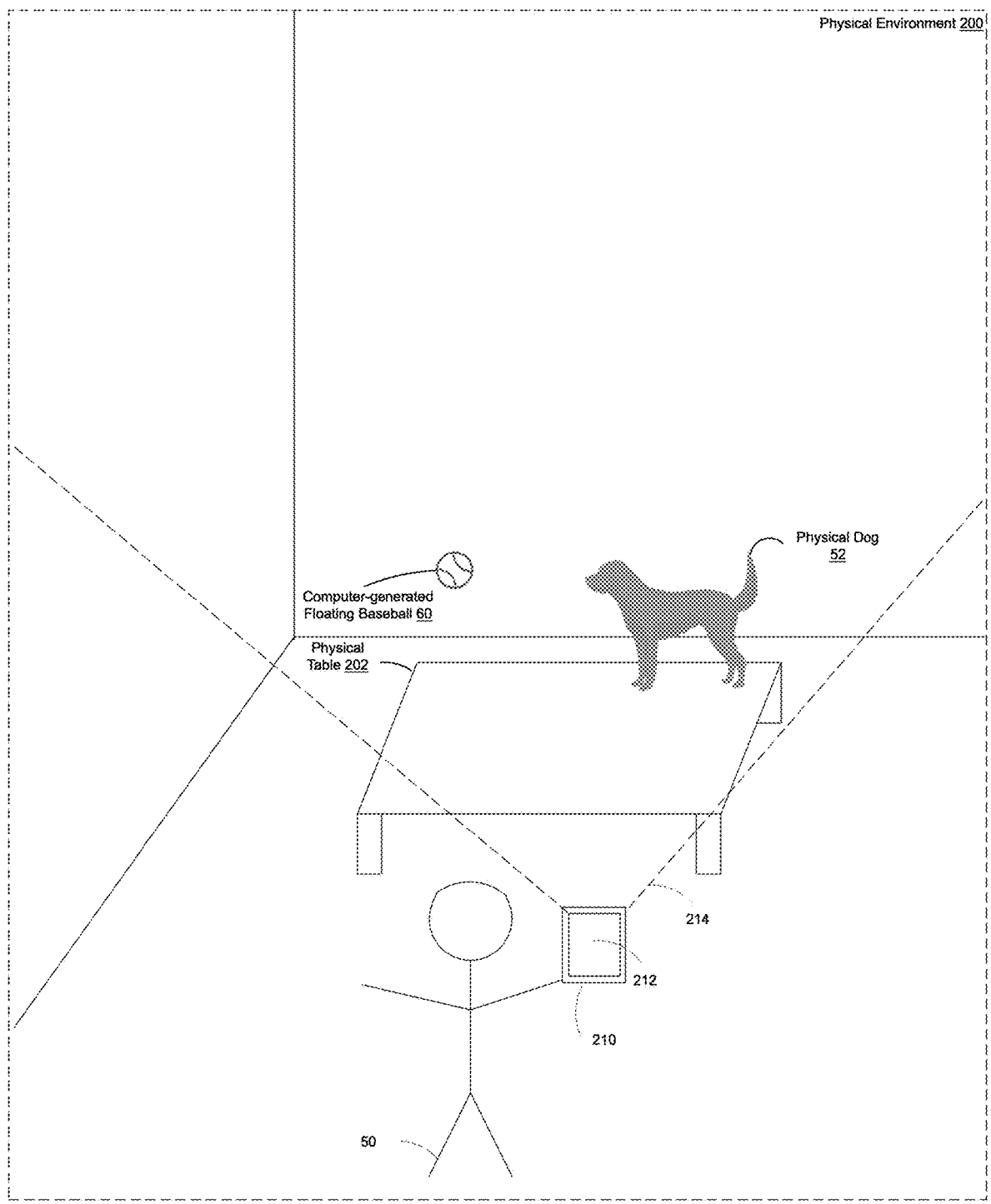
FIGS. 2A-2M are examples of generating volumetric representations of corresponding capture regions in accordance with some implementations.

As illustrated in FIG. 2A, a physical environment 200 includes a user 50, holding an electronic device 210. The physical environment 200 also includes a physical dog 52, sitting atop of a physical table 202. In some implementations, the electronic device 210 corresponds to a mobile device, such as a smartphone, laptop, tablet, etc. In some implementations, the electronic device 210 is similar to and adapted from the electronic device 100 in FIG. 1.

In some implementations, the electronic device 210 corresponds to a head-mountable device (HMD) that includes an integrated display (e.g., a built-in display) that displays an XR environment, such as an AR environment, VR environment, or other computer-generated environments. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the XR environment. For example, in some implementations, the electronic device 210 corresponds to a mobile phone that can be attached to the head-mountable enclosure. In various implementations, examples of the electronic device 210 include smartphones, tablets, media players, laptops, etc.

The electronic device 210 includes a display 212. The display 212 is associated with a field-of-view 214 that includes a portion of the physical environment 200, which includes the physical dog 52 and a portion of the physical table 202. Accordingly, the display 212 displays a representation of the portion of the physical environment 200 that includes a representation of the physical table 202 and a representation of the physical dog 52. Moreover, the display 212 displays a computer-generated (e.g., virtual) floating baseball 60. For example, in some implementations, the electronic device 210 generates the computer-generated floating baseball 60. As another example, in some implementations, the electronic device 210 obtains the computer-generated floating baseball 60, such as from a memory, database, server, etc.

Figure 2B:
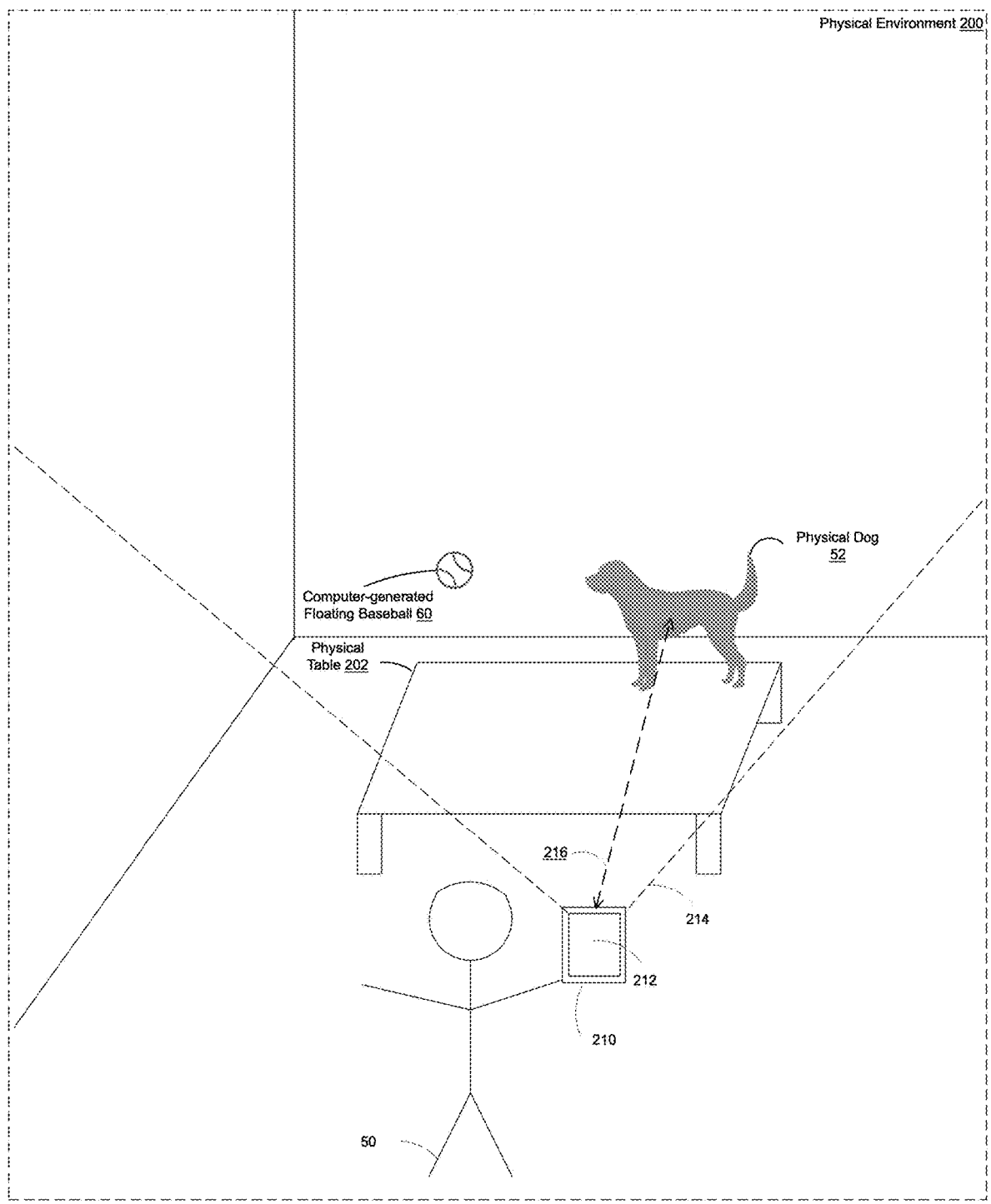

As illustrated in FIG. 2B, the electronic device 210 obtaining depth information 216 characterizing the physical environment 200. For example, the electronic device 210 includes a combination of depth sensor(s) and time-of-flight sensor(s) for obtaining the depth information 216. Although the example in FIG. 2B shows the depth information 216 as characterizing the physical dog 52, one of ordinary skill in the art will appreciate that, in some implementations, the electronic device 210 obtains depth information characterizing additional or alternative physical objects within the physical environment 200, such as an edge or surface of the physical table 202.

Figure 2C:
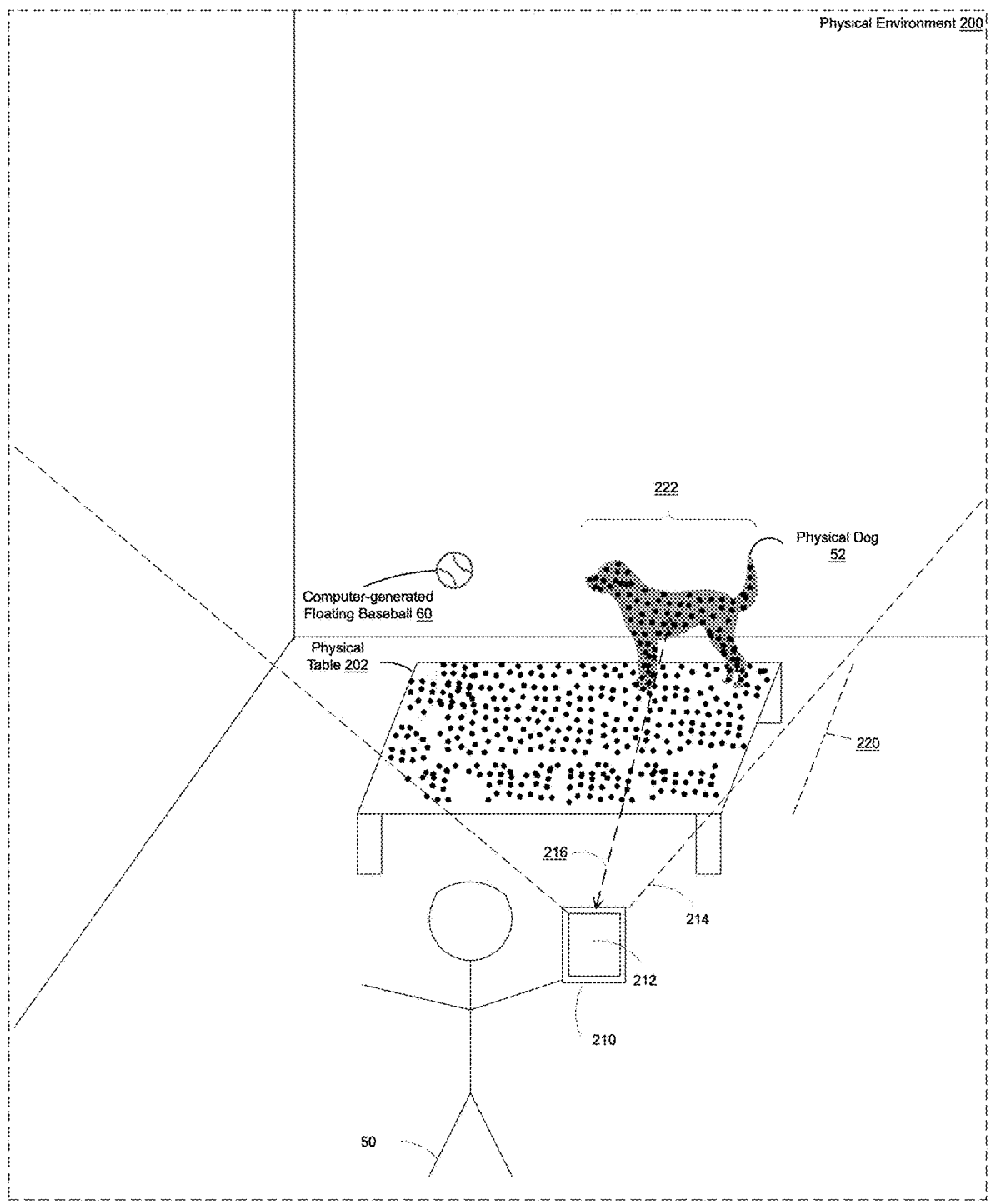

As illustrated in FIG. 2C, the electronic device 210 generates three-dimensional (3D) point clouds associated with the representation of the physical environment 200. Namely, the electronic device 210 generates a first 3D point cloud 220 associated with the representation of the physical table 202, and a second 3D point cloud 222 associated with the representation of the physical dog 52. For example, the electronic device 210 generates the 3D point clouds using visual inertial odometry (VIO).

Figure 2D:
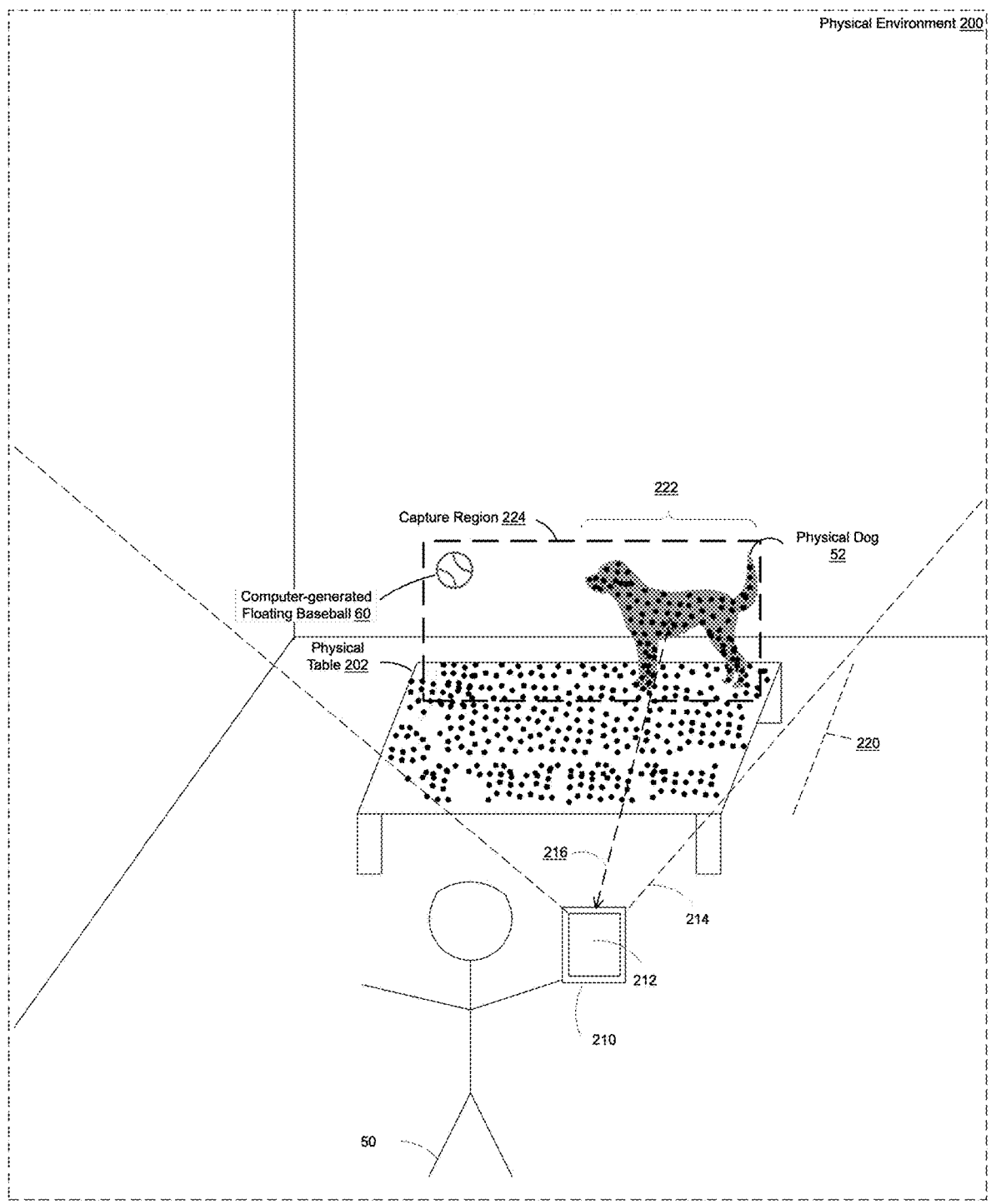

As illustrated in FIG. 2D, the electronic device 210 sets (e.g., defines or designates) a capture region 224 within the representation of the physical environment 200. The capture region 224 includes the representation of the physical dog 52 and the computer-generated floating baseball 60. The capture region 224 may be any volumetric region, such as a rectangular prism illustrated in FIG. 2D.

In some implementations, the electronic device 210 sets the capture region 224 based on a function of extremity tracking data obtained from an extremity tracking sensor (e.g., the extremity tracking sensor 150 in FIG. 1). For example, the extremity tracking data is associated with the user 50, such as the user 50 tracing the capture region 224 with a finger. As another example, in some implementations, the display 212 displays a menu of predefined volumetric regions (e.g., cube, prism, pyramid, cylinder, etc.), and the electronic device 210 receives an input (e.g., an extremity of the user 50) directed to a particular one of the predefined volumetric regions. Continuing with this example, in response to receiving the input, the electronic device 210 sets the capture region 224 to the particular one of the predefined volumetric regions.

In some implementations, the electronic device 210 sets the capture region 224 based on a function of eye tracking data obtained from an eye tracking sensor (e.g., the eye tracking sensor(s) 164 in FIG. 1). For example, the eye tracking data is associated with the user 50, such as a gaze of the user 50 setting the capture region 224.

Figure 2E:
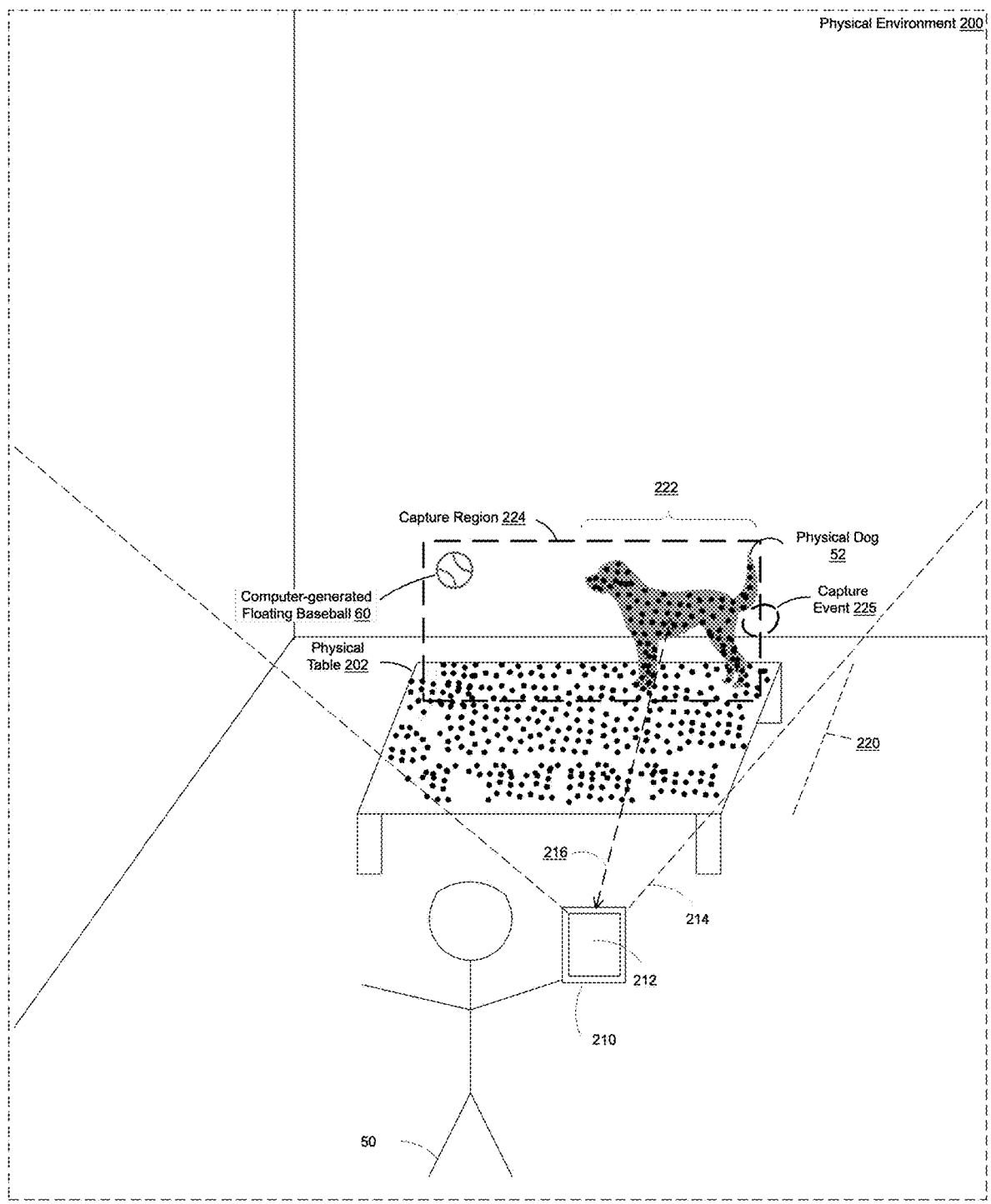

As illustrated in FIG. 2E, the electronic device 210 obtains a capture event 225. According to various implementations, the capture event 225 corresponds to a capture request initiated by the user 50, such as a user input. For example, in some implementations, an extremity tracker or eye tracker, included in the electronic device 210, detects an input directed to a capture affordance that is displayed on the display 212. For example, in some implementations, the electronic device 210 initiates the capture event 225 responsive to a hand-based gesture or to a long-stare directed to the capture affordance, or a combination of the two. On the other hand, in some implementations, the electronic device 210 obtains the capture event 225 independent of intervention by the user 50, such as described with reference to FIGS. 2J-2M.

Figure 2F:
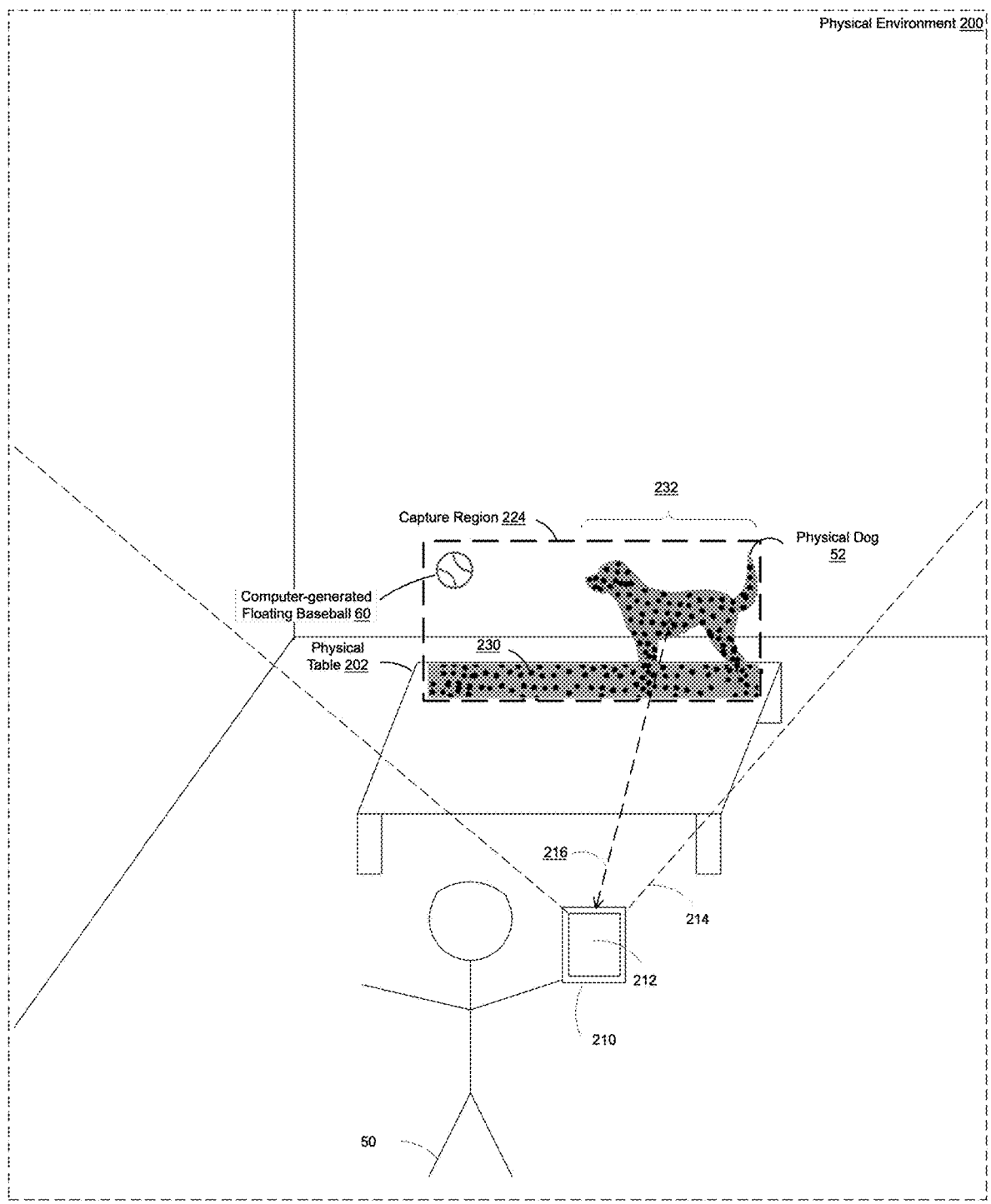

In response to obtaining the capture event 225 in FIG. 2E, the electronic device 210 disambiguates respective groups of points from the 3D point clouds in FIG. 2F. Each of the respective groups of points satisfies a spatial threshold with respect to the capture region 224.

The electronic device 210 disambiguates a first group of points 230 from the first 3D point cloud 220. The first group of points 230 is within (e.g., inside of) the capture region 224.

Moreover, the electronic device 210 disambiguates a second group of points 232 from the second 3D point cloud 222. For example, before obtaining the capture event 225 in FIG. 2E, the electronic device 210 generates the second 3D point cloud 222 from various fields-of-view. The user 50 may walk around the physical table 202 while pointing the electronic device 210 at the physical dog 52, causing the electronic device 210 to generate the second 3D point cloud 222 from the various fields-of-view. Subsequently, the electronic device 210 obtains the capture event 225 in FIG. 2E, and responsive to the event, electronic device 210 disambiguates the second group of points 232 based on the current field-of-view 214 in FIG. 2F. One of ordinary skill in the art will appreciate that a group of points may satisfy the spatial threshold under different circumstances. For example, each of a group of points is less than a threshold distance from a portion within the capture region 224, such as the center of the capture region 224. As another example, the center of the group of points is less than a threshold distance from a portion within the capture region 224.

Figure 2G:
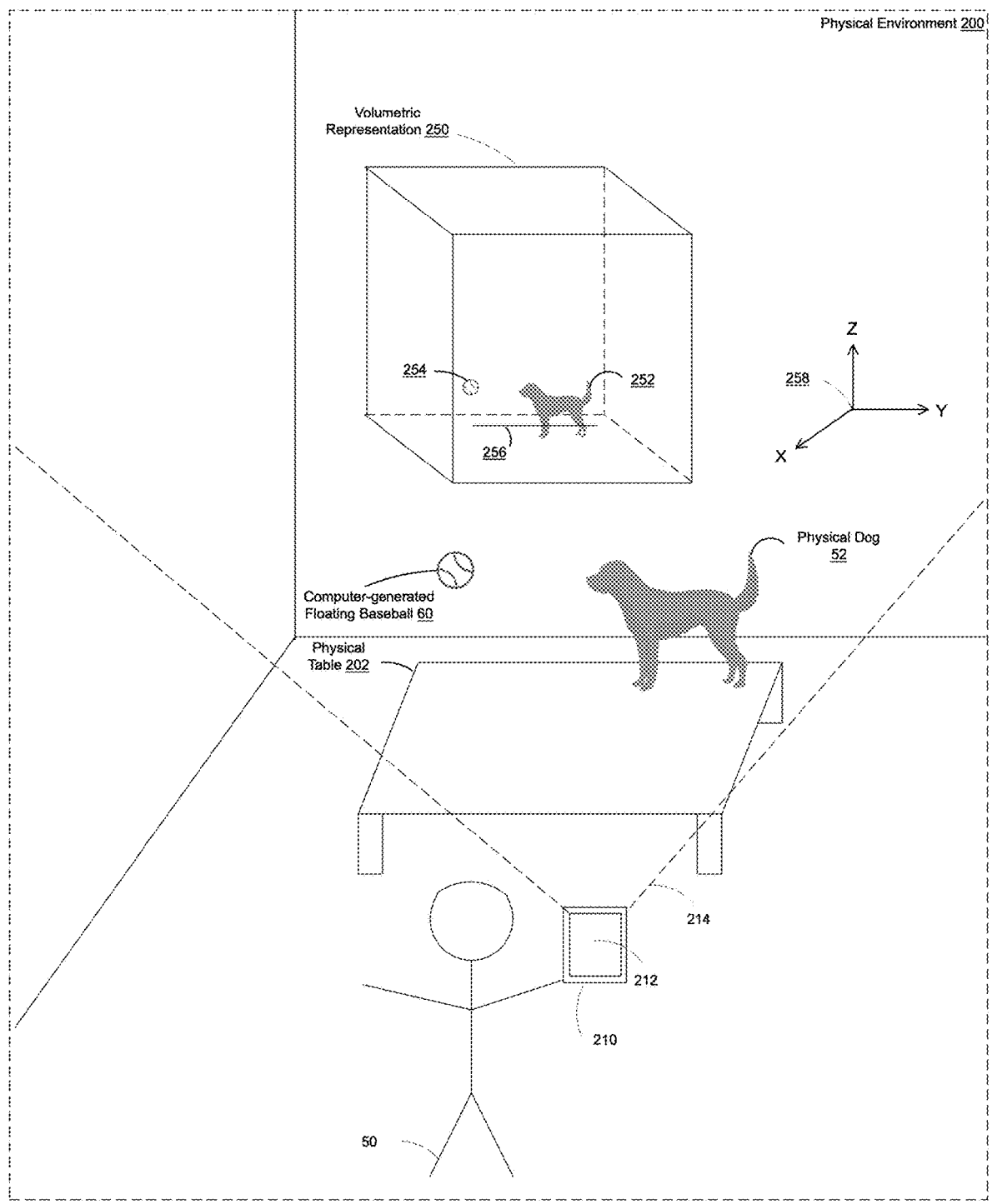

In response to obtaining the capture event 225 in FIG. 2E, the electronic device 210 generates, based on a function of the depth information 216, the first group of points 230, and the second group of points 232, a volumetric representation 250 of the capture region 224 in FIG. 2G. The volumetric representation 250 includes a volumetric representation 252 of the physical dog 52, a volumetric representation 254 of the computer-generated floating baseball 60, and a volumetric representation 256 of the physical table 202. The volumetric representation 256 of the physical table 202 includes a portion of the physical table 202, as defined by the capture region 224. Namely, the volumetric representation 256 of the physical table 202 includes the back edge of the physical table 202. The volumetric representation 250 includes the aforementioned volumetric representations arranged in a spatial relationship according to 3D coordinates 258. For example, the 3D coordinates 258 define a respective set of points existing in a 3D space.

Figure 2H:
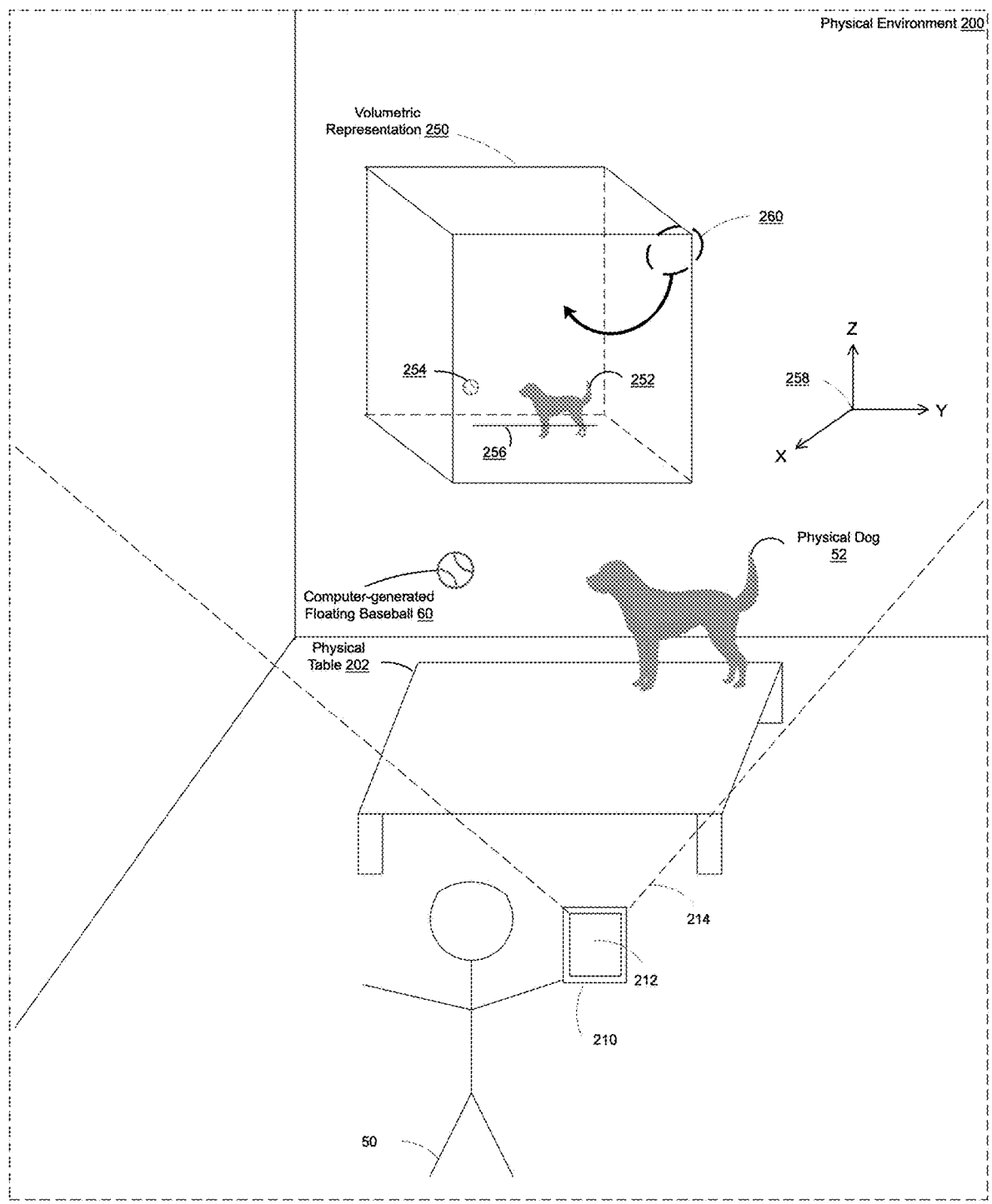
Figure 2I:
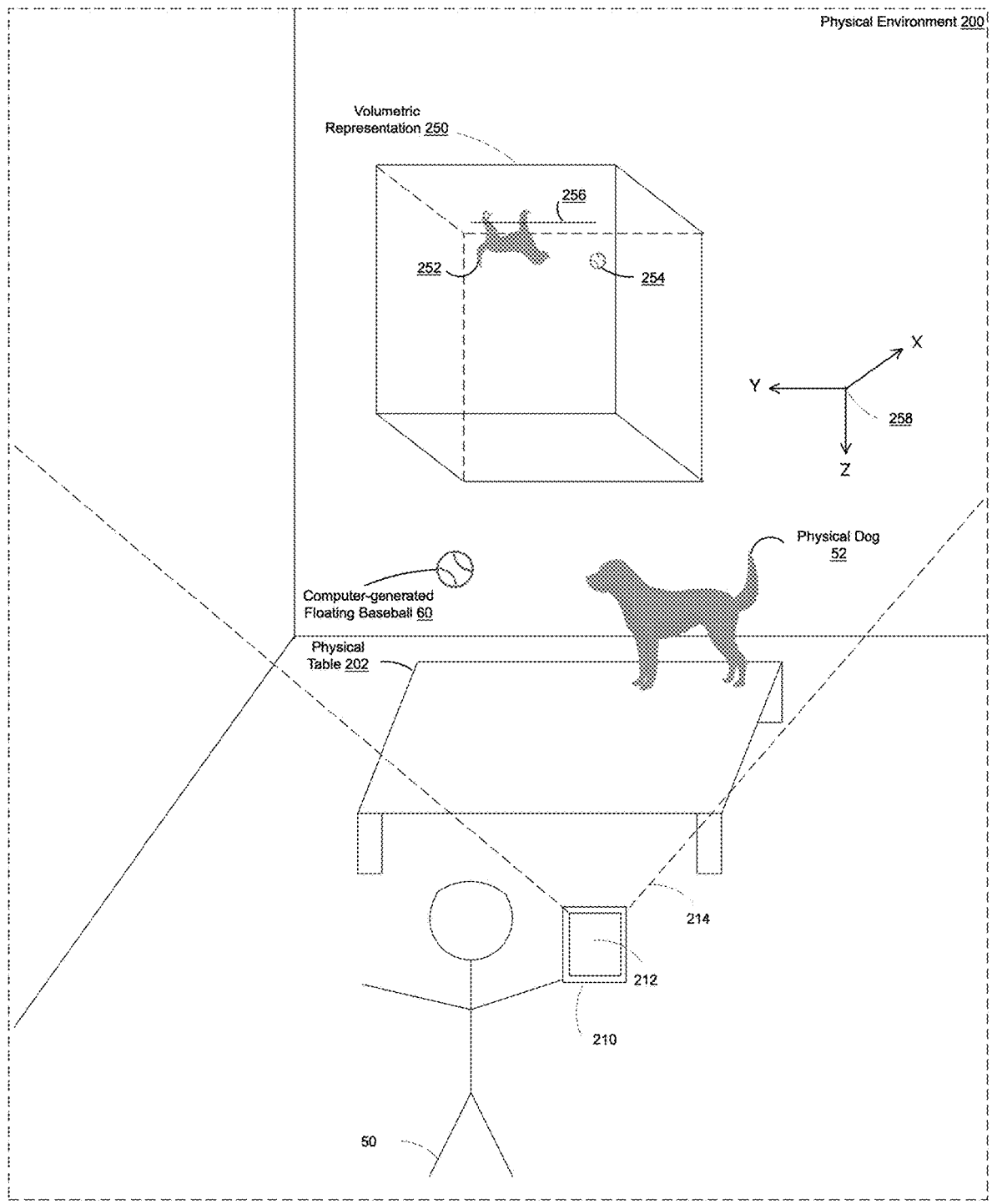
Figure 2J:
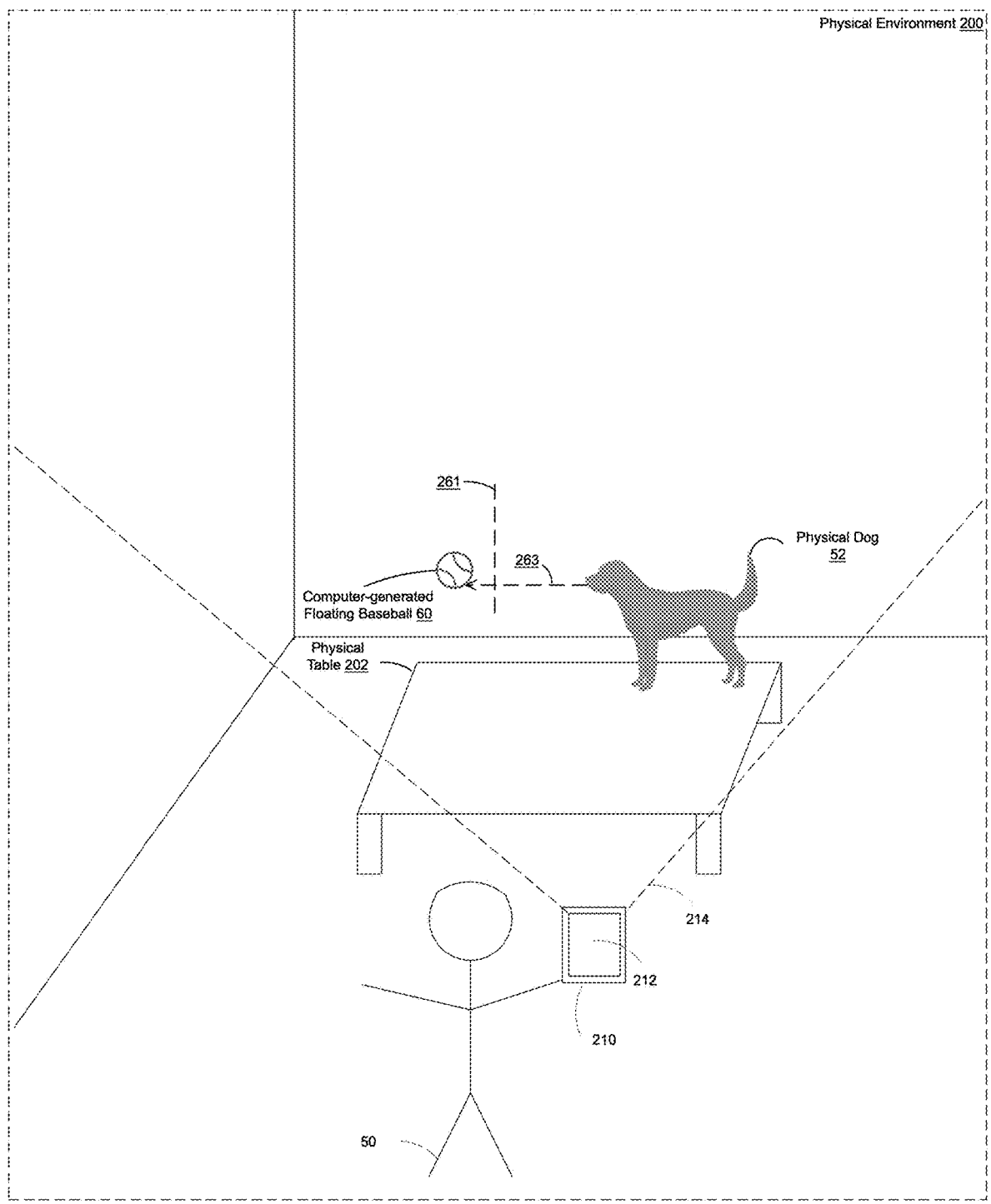

According to various implementations, the volumetric representation 250 is manipulatable. For example, in some implementations, changing the field-of-view 214 associated with the display 212 correspondingly changes a viewing perspective of the volumetric representation 250 displayed by the display 212. As another example, in some implementations, as illustrated in FIG. 2H, the electronic device 210 receives a manipulation input 260, such as a finger of the user 50 turning the volumetric representation 250 upside down (rotating 180 degrees about the z-axis). In response to receiving the manipulation input 260 in FIG. 2H, the display 212 changes the viewing perspective of the volumetric representation 250 in order to turn the volumetric representation 250 upside down, as illustrated in FIG. 2I. Accordingly, the 3D coordinates 258 likewise change orientation. One of ordinary skill in the art will appreciate that different manipulation inputs will change the viewing perspective in different ways. For example, when the manipulation input 260 received in FIG. 2H instead rotates the volumetric representation 250 by 180 degrees about the y-axis, the display 212 changes the viewing perspective of the volumetric representation 250 such that the volumetric representation 252 faces rightwards while being right-side up, with the volumetric representation 254 positioned to the right of the volumetric representation 252.

Figure 2K:
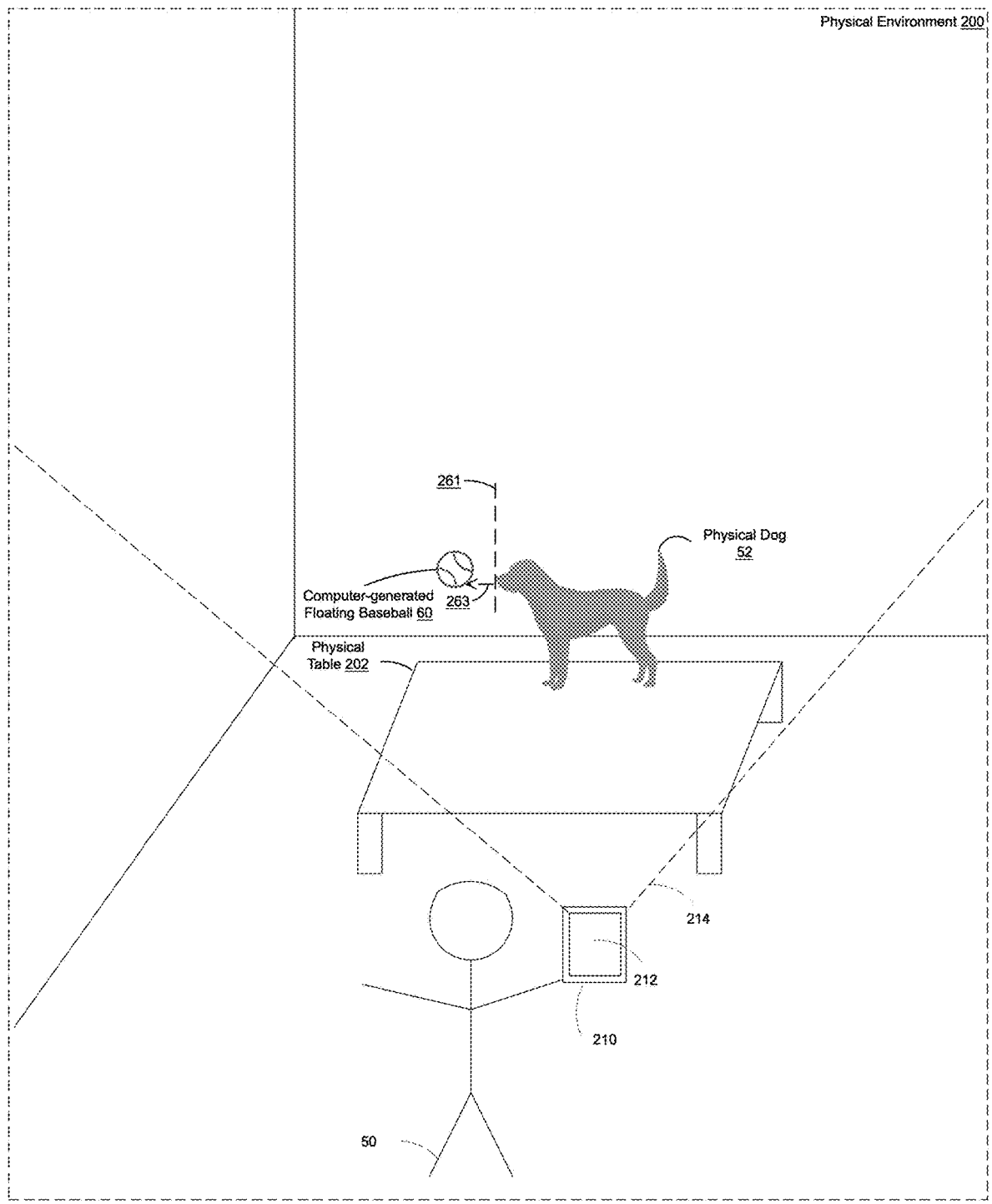

FIGS. 2J-2M illustrate generating a volumetric representation of a capture region based on detected scene change. As illustrated in the FIG. 2J, the physical dog 52 is beginning to move towards the computer-generated floating baseball 60, as is indicated by movement line 263 (illustrated for purely explanatory purposes). As illustrated in FIG. 2K, the physical dog 52 reaches a threshold line 261 (illustrated for purely explanatory purposes). For example, the threshold line 261 is a threshold distance from the computer-generated floating baseball 60.

Figure 2L:
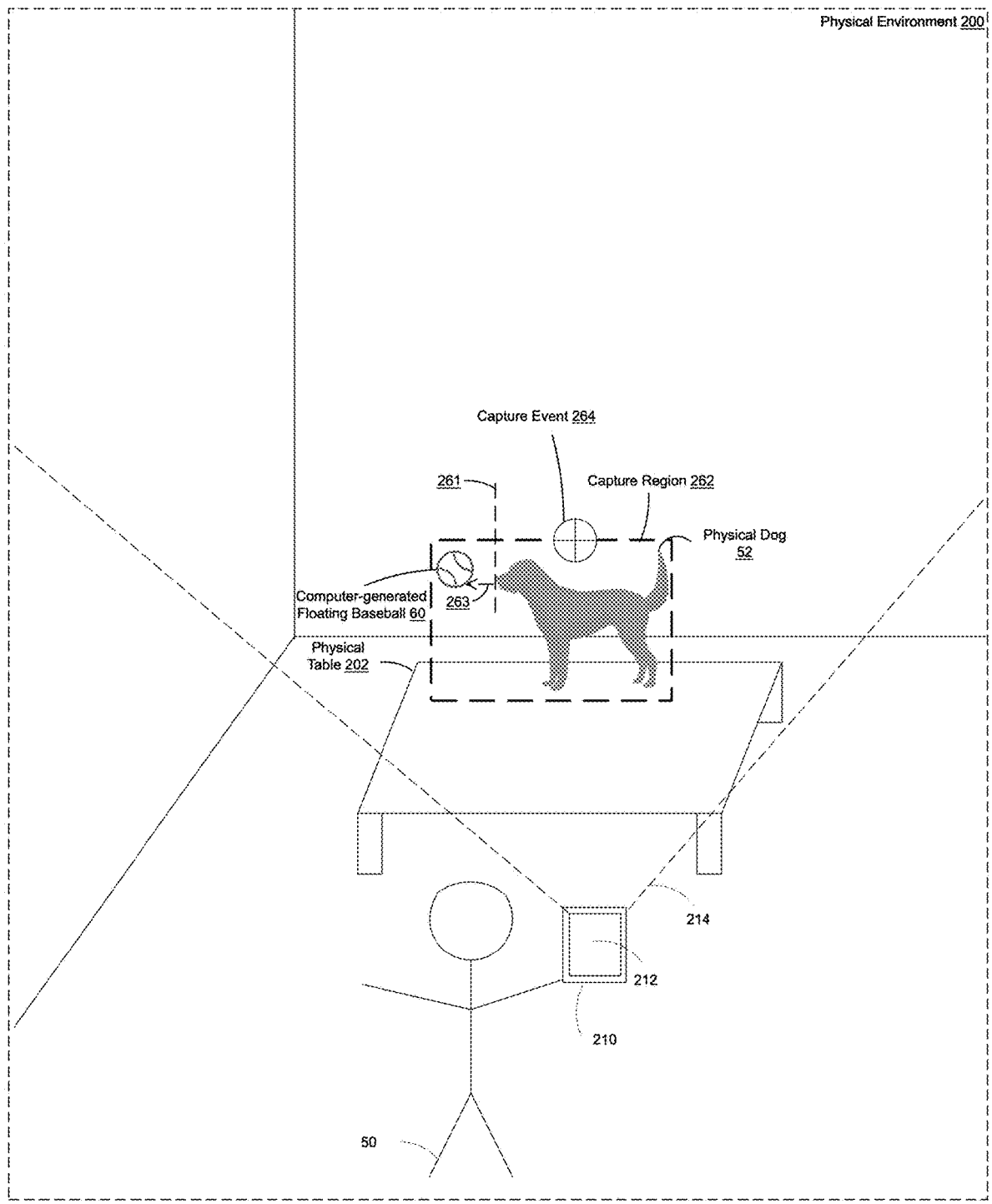
Figure 2M:
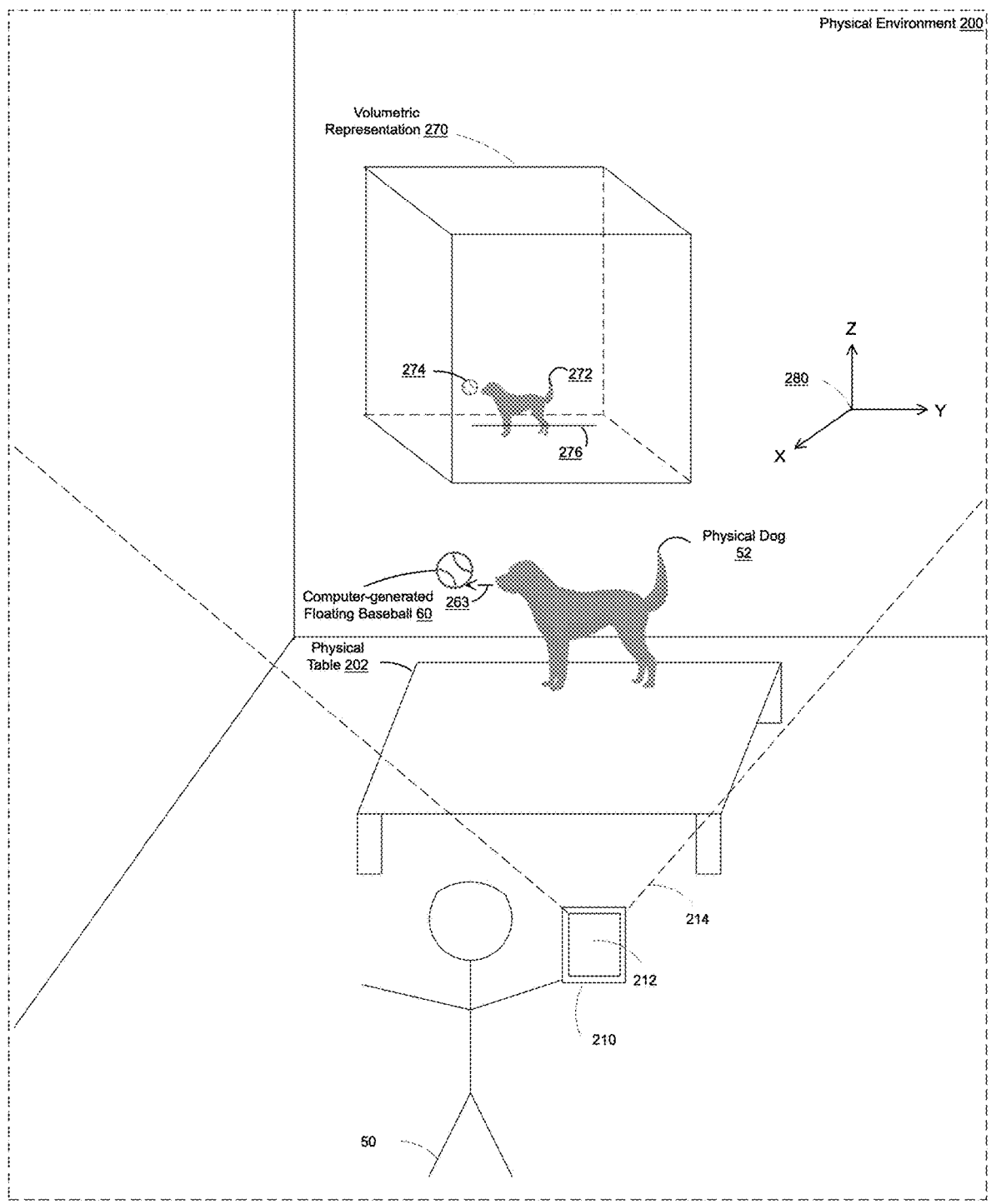

In response to detecting the physical dog 52 reaching the threshold line 261 in FIG. 2K, the electronic device 210 (automatically, without intervention by the user 50) sets a capture region 262 and initiates a capture event 264 in FIG. 2L. For example, the capture region 262 includes the representation of the physical dog 52 because the physical dog 52 is the object that is moving within the physical environment 200. A discussion of obtaining depth information and disambiguating points from a 3D point cloud, as discussed with reference to FIGS. 2A-2I, is omitted for the sake of brevity. As represented in FIG. 2M, the electronic device 210 generates a volumetric representation 270, including volumetric representations of objects, arranged in a spatial relationship according to 3D coordinates 280. Notably, as compared with the volumetric representation 250 illustrated in FIG. 2G, the volumetric representation 270 in FIG. 2M includes a volumetric representation 272 of the physical dog 52 that is closer to a volumetric representation 274 of the computer-generated floating baseball 60. The volumetric representation 272 is closer to the volumetric representation 274 because the physical dog 52 had been moving towards the computer-generated floating baseball 60. The volumetric representation 270 also includes a volumetric representation 276 of the physical table 202.

Figure 3:
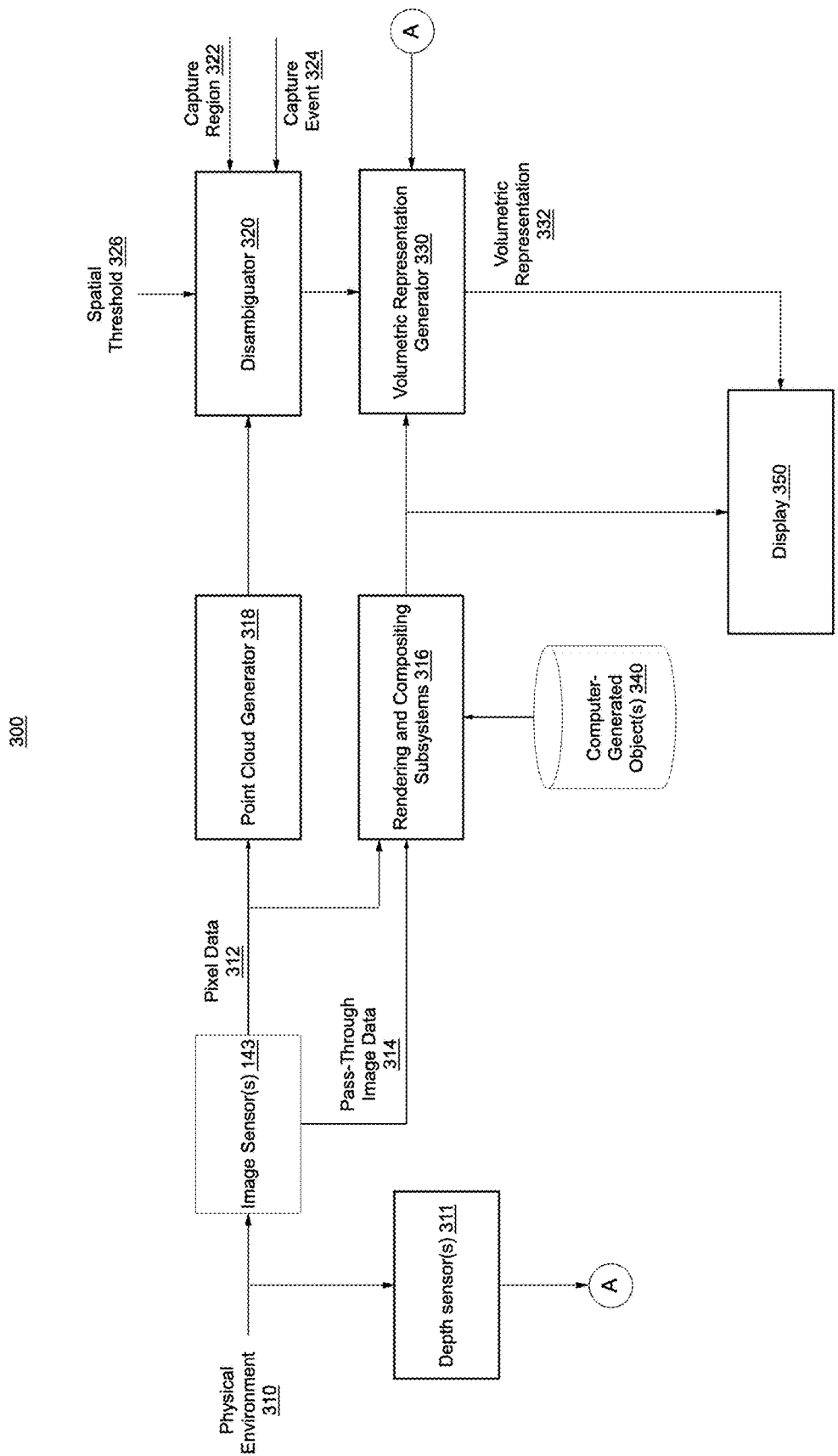
FIG. 3 is an example of a block diagram of a system for generating a volumetric representation of a capture region in accordance with some implementations.

FIG. 3 is an example of a block diagram of a system 300 for generating a volumetric representation of a capture region in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, in various implementations, the system 300 includes one or more depth sensors 311, one or more image sensors 143, rendering and compositing subsystems 316, a point cloud generator 318, a disambiguator 320, a volumetric representation generator 330, one or more computer-generated objects 340, and a display 350.

The depth sensor(s) 311 obtain depth information characterizing a physical environment 310. In some implementations, the depth sensor(s) 311 includes a time-of-flight sensor. As will be described below, the volumetric representation generator 330 utilizes the depth information in order to generate a volumetric representation 332 of a capture region 322.

In some implementations, the system 300 includes image sensor(s) 143 that capture the physical environment 310 and output corresponding pixel data 312. The rendering and compositing subsystems 316 composite the pixel data 312 with the computer-generated object(s) 340 in order enable display, by the display 350, of a computer-generated environment (e.g., an augmented reality (AR) environment). On the other hand, in some implementations, the system 300 includes a display 350 that is see-through (e.g., translucent), which enables ambient light from the physical environment 310 to enter the display 350. In such implementations, the system 300 adds the computer-generated object(s) 340 to the ambient light in order to display a computer-generated environment on the display 350.

In some implementations, the point cloud generator 318 generates a 3D point cloud associated with the pixel data 312. In implementations including a see-through display, the point cloud generator 318 generates a 3D point cloud associated with the ambient light (rather than the pixel data 312). In some implementations, the point cloud generator 318 uses VIO to generate the 3D point cloud.

In response to obtaining a capture event 324, the disambiguator 320 disambiguates a group of points from the 3D point cloud. The group of points satisfies a spatial threshold 326 with respect to a capture region 322. For example, with reference to FIGS. 2E and 2F, in response to obtaining the capture event 225, the electronic device 210 disambiguates a first group of points 230 and a second group of points 232 from respective 3D point clouds. The capture event 324 may correspond to, for example, a user-initiated capture event 324 (e.g., extremity tracking indicates that a user is selecting a capture affordance) or a system-detected capture event 324 (e.g., scene change). For example, the system 300 obtains the capture event 324 in response to detecting a threshold amount of change to the representation of the physical environment and/or change to a portion of the computer-generated object(s) 340. An example of a system-detected capture event 324 is provided with reference to FIGS. 2J-2M.

Based on the group of points and the depth information from the depth sensor(s) 311, the volumetric representation generator 330 generates the volumetric representation 332 of a capture region 322 in response to obtaining the capture event 324. In some implementations, the display 350 displays the volumetric representation 332. For example, as illustrated in FIG. 2G, the display 212 displays the volumetric representation 250, which is associated with 3D coordinates 258. In some implementations, the display 350 includes a retinal projection display system. In some implementations, the display 350 corresponds to an opaque or semi-opaque display. In some implementations, the display 350 corresponds to a pass-through display, such as a translucent or transparent display.

Figure 4:
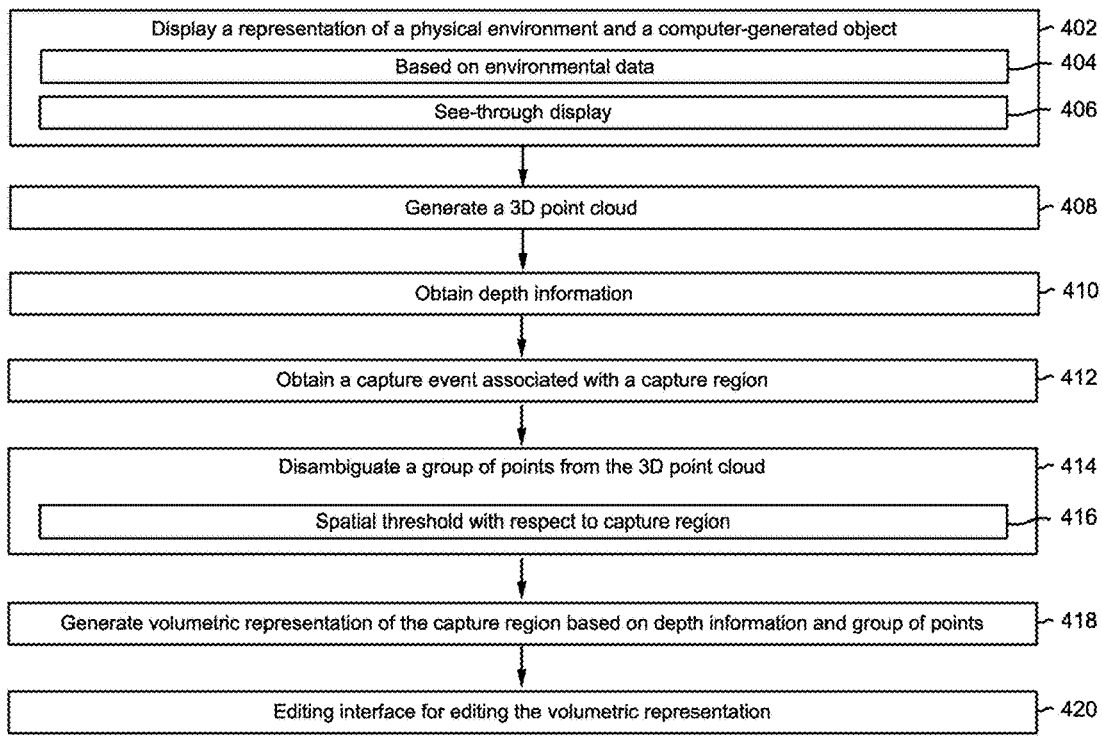
FIG. 4 is an example of a flow diagram of a method of generating a volumetric representation of a capture region in accordance with some implementations.

FIG. 4 is an example of a flow diagram of a method 400 of generating a volumetric representation of a capture region in accordance with some implementations. In various implementations, the method 400 or portions thereof are performed by an electronic device (e.g., the electronic device 100 in FIG. 1 or the electronic device 210 in FIGS. 2A-2M). In various implementations, the method 400 or portions thereof are performed by an HMD. In some implementations, the method 400 is performed by a system, such as the system 300 in FIG. 3. In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes displaying, on a display, a representation of a physical environment and a computer-generated object, such as illustrated in FIG. 2A. In some implementations, the method 400 includes concurrently displaying the representation of the physical environment and the computer-generated object.

As represented by block 404, in some implementations, the method 400 includes obtaining, via an environmental sensor included in an electronic device, environmental data characterizing the representation of the physical environment. For example, with reference to FIG. 3, the image sensor(s) 143 capture the physical environment 310 and output pixel data characterizing the representation of the physical environment. In some implementations, the environmental sensor includes one or more of an image sensor or a depth sensor. In some implementations, the environmental data is characterized by a plurality of poses with respect to the physical environment. For example, each of the plurality of poses is associated with a respective field-of-view of an image sensor.

As represented by block 406, in some implementations, an electronic device includes a see-through display that permits ambient lights from the physical environment to enter the see-through display. In such implementations, the see-through display adds computer-generated object(s) to the ambient light in order to display a computer-generated environment, such as an AR environment.

As represented by block 408, the method 400 includes generating a three-dimensional (3D) point cloud associated with the representation of the physical environment. For example, with reference to FIG. 2C, the electronic device 210 generates a first 3D point cloud 220 associated with the representation of the physical table 202, and a second 3D point cloud 222 associated with the representation of the physical dog 52.

As represented by block 410, the method 400 includes obtaining depth information characterizing the physical environment, such as the depth information 216 in FIG. 2B. For example, with reference to FIG. 3, the depth information may be obtained via the depth sensor(s) 311. In some implementations, the depth information includes a combination of machine learned depth information (e.g., from a neural network), depth sensor data, 3D reconstruction data, visual inertia odometry (VIO) data, time of flight data, etc.

As represented by block 412, the method 400 includes obtaining a capture event associated with a capture region within the representation of the physical environment. The capture region includes a portion of the computer-generated object. For example, with reference to FIG. 2E, the electronic device 210 obtains the capture event 225, which is associated with the capture region 224. In other words, the capture event 225 triggers capture of the capture region 224.

As represented by block 414, the method 400 includes, in response to obtaining the capture event, disambiguating a group of points from the 3D point cloud. As represented by block 416, the group of points satisfies a spatial threshold with respect to the capture region. For example, the group of points is included within the capture region. As another example, a threshold number of the group of points is a threshold distance away from a portion of the capture region, such as the center of the capture region.

As represented by block 418, the method 400 includes, in response to obtaining the capture event, generating, based on a function of the depth information and the group of points, a volumetric representation of the capture region. The volumetric representation includes a volumetric representation of the portion of the computer-generated object. For example, the method 400 includes generating the volumetric representation via surface reconstruction, such as a Poisson reconstruction. As another example, the group of points is converted to polygon mesh or triangle mesh models, non-uniform rational b-spline (NURBS) surface models, or CAD models. As yet another example, the method 400 includes using a combination of Delaunay triangulation, alpha shapes, or ball pivoting in order to build a network of triangles over the existing vertices of the 3D point cloud. In some implementations, the method 400 includes generating, from the volumetric representation, a two-dimensional (2D) representation of the physical environment including a 2D representation of the portion of the computer-generated object.

As represented by block 420, in some implementations, the method 400 includes displaying, on the display, an editing interface that includes a set of content manipulation affordances for editing the volumetric representation. For example, the content manipulation affordances that perform various functions including annotation, opacity change, pencil, eraser, and/or the like. In some implementations, the editing interface includes the volumetric representation.

Figure 5:
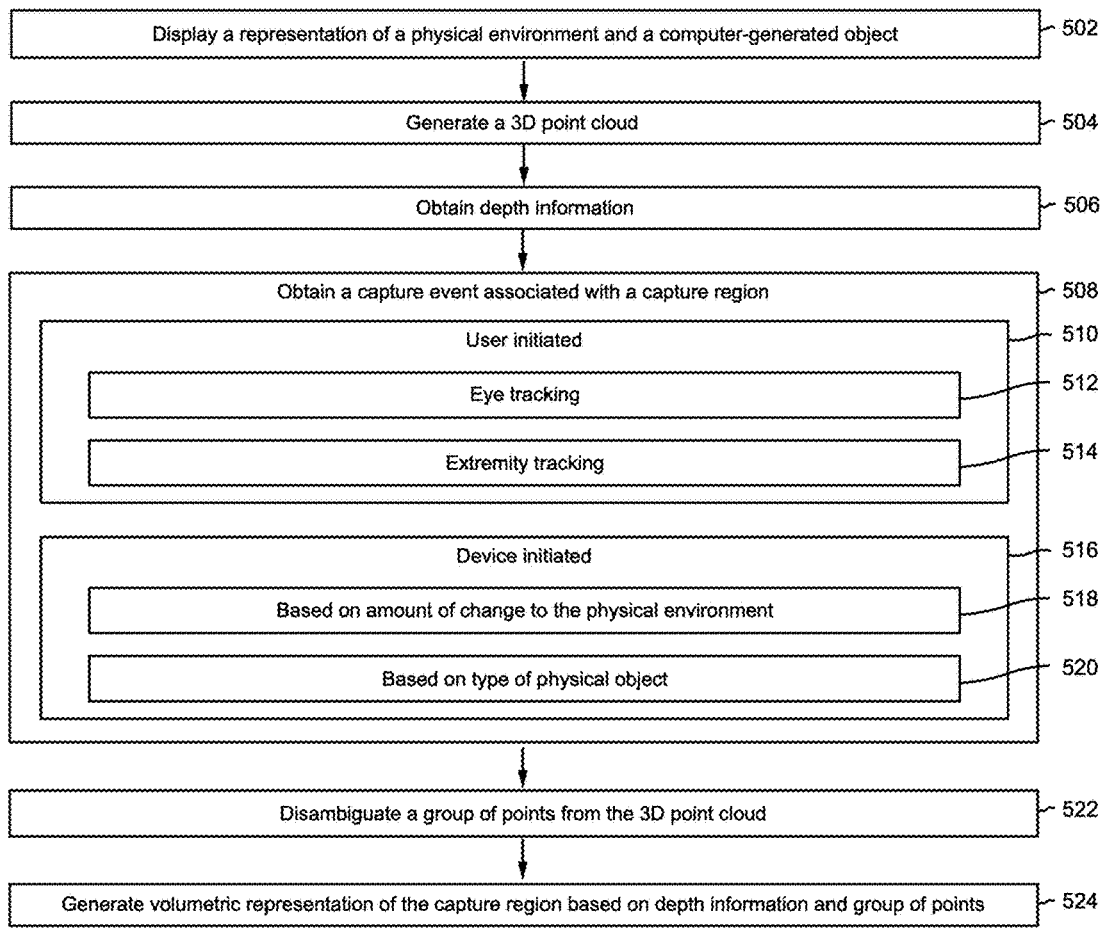
FIG. 5 is another example of a flow diagram of a method of generating a volumetric representation of a capture region in accordance with some implementations.

FIG. 5 is another example of a flow diagram of a method 500 of generating a volumetric representation of a capture region in accordance with some implementations. In various implementations, the method 500 or portions thereof are performed by an electronic device (e.g., the electronic device 500 in FIG. 1 or the electronic device 210 in FIGS. 2A-2M). In various implementations, the method 500 or portions thereof are performed by an HMD. In some implementations, the method 500 is performed by a system, such as the system 300 in FIG. 3. In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes displaying, on a display, a representation of a physical environment and a computer-generated object. As represented by block 504, the method 500 includes generating a three-dimensional (3D) point cloud associated with the representation of the physical environment. As represented by block 506, the method 500 includes obtaining depth information characterizing the physical environment.

As represented by block 508, the method 500 includes obtaining a capture event associated with a capture region within the representation of the physical environment. The capture region includes a portion of the computer-generated object. In some implementations, as represented by block 510, the capture event is user-initiated. For example, the method 500 includes displaying a screenshot menu overlaid on the representation of the physical environment, and receiving an input is directed to a capture affordance within the screenshot menu.

In some implementations, as represented by block 512, an electronic device includes an eye tracking sensor that outputs eye tracking data, and the method 500 further includes setting the capture region based on the eye tracking data. For example, the eye tracking data is indicative of movement of an eye gaze of a user that satisfies a spatial relationship with respect to the capture region. In some implementations, the method 500 includes determining that the eye gaze corresponds to the capture region for at least a threshold amount of time. In some implementations, the method 500 includes determining that the eye gaze corresponds to an area within the representation of the physical environment that is within a threshold distance from capture region.

In some implementations, as represented by block 514, an electronic device includes an extremity tracking sensor that outputs extremity tracking data, and the method 500 further includes setting the capture region based on the extremity tracking data. For example, the extremity tracking data is indicative of movement of an extremity of a user that satisfies a spatial relationship with respect to the capture region. In some implementations, the method 500 includes determining that the extremity position corresponds to an area within the representation of the physical environment that is within a threshold distance from the capture region. The extremity of a user may correspond to the user's finger, hand, foot, etc. In some implementations, the method 500 includes detecting that a user draws a volumetric space (e.g., a cube, sphere, etc.), wherein the volumetric space defines the capture region.

In some implementations, as represented by block 516, the capture event is device- or system-initiated. In some implementations, as represented by block 518, obtaining the capture event includes detecting a threshold amount of change within the computer-generated environment. For example, with reference to FIGS. 2J-2L, the electronic device 210 obtains the capture event 264 in response to determining that the physical dog 52 has moved within a threshold distance from the computer-generated floating baseball 60, as indicated by the threshold line 261. In some implementations, the method 500 includes using machine learning, such a neural network, in order to detect the threshold amount of content change. For example, the neural network is trained to identify salient physical objects within the computer-generated environment. In some implementations, the method 500 includes setting the capture region based on a function of a first region of the representation of the physical environment that is associated with the threshold amount of change. For example, with reference to FIGS. 2J-2L, in response to determining that the physical dog 52 has moved within the threshold distance from the computer-generated floating baseball 60, the electronic device 210 sets the capture region 262 in order to include the representation of the physical dog 52.

In some implementations, as represented by block 520, an electronic device obtains the capture event based on a type of identified physical object. For example, an object type may include one of a movable object (e.g., chair), a structural object (e.g., wall or floor), a fixed object (e.g., washing machine), etc. To that end, in some implementations, the method 500 includes identifying a physical object within the representation of the physical environment, such as via instance segmentation or semantic segmentation. The method 500 includes, in accordance with a determination that the physical object is of a first object type, obtaining the capture event associated with a capture region including the physical object, and in accordance with a determination that the physical object is not of the first object type, forgoing obtaining the capture event. In some implementations, a portion of the capture region is bounded by the physical object. In other words, the portion of the captured region corresponds to the depth of the physical object.

As represented by block 522, the method 500 includes, in response to obtaining the capture event, disambiguating a group of points from the 3D point cloud. The group of points satisfies a spatial threshold with respect to the capture region. As represented by block 524, the method 500 includes, in response to obtaining the capture event, generating, based on a function of the depth information and the group of points, a volumetric representation of the capture region.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, an input device, an image sensor, and a display:
capturing, via the image sensor, at least one image of a physical environment;
generating an extended reality (XR) environment, including a representation of the physical environment and a computer-generated object, based on the at least one image of the physical environment and the computer-generated object;
while displaying, on the display, the XR environment including the representation of the physical environment and the computer-generated object:
generating a three-dimensional (3D) point cloud characterizing the physical environment; and
obtaining depth information characterizing the physical environment;
detecting, via the input device, a user input defining a capture region that includes a portion of the XR environment, wherein the capture region includes a portion of the physical environment and a portion of the computer-generated object; and
in response to detecting the user input:
selecting a group of points from the 3D point cloud characterizing the physical environment based on the capture region, wherein the group of points satisfies a spatial threshold relative to the capture region;
generating, based on a function of the depth information and the group of points, a volumetric representation of the capture region, wherein the volumetric representation of the capture region includes a volumetric representation of the portion of the physical environment and a volumetric representation of the portion of the computer-generated object, wherein the volumetric representation of the portion of the physical environment is different from the representation of the physical environment, and wherein the volumetric representation of the portion of the computer-generated object is different from the computer-generated object; and
storing the volumetric representation of the capture region in the non-transitory memory.

2. The method of claim 1, wherein the display corresponds to a see-through display, and wherein the see-through display permits ambient light from the physical environment through the see-through display.

3. The method of claim 1, wherein the input device corresponds to one of an eye tracking sensor that outputs eye tracking data and an extremity tracking sensor that outputs extremity tracking data, and wherein the capture region is defined by at least one of the eye tracking data or the extremity tracking data.

4. The method of claim 1, further comprising:
modifying the capture region in response to-detecting one of a threshold amount of change within the representation of the physical environment or detecting the threshold amount of change with respect to the computer-generated object.

5. The method of claim 1, further comprising displaying, on the display, an editing interface that includes a set of content manipulation affordances for editing the volumetric representation.

6. The method of claim 1, further comprising:
concurrently displaying, on the display, the XR environment and the volumetric representation of the capture region.

7. The method of claim 6, further comprising:
after displaying the volumetric representation of the capture region, detecting, via the input device, a manipulation input directed to the volumetric representation of the capture region; and
in response to detecting the manipulation input, changing a viewing perspective of the volumetric representation of the capture region.

8. A electronic device comprising:
a display;
an input device;
an image sensor;
one or more processors;
non-transitory memory; and
one or more programs, wherein the one or more programs are stored in the non-transitory memory and configured to be executed by the one or more processors, the one or more programs including instructions for:
capturing, via the image sensor, at least one image of a physical environment;
generating an extended reality (XR) environment, including a representation of the physical environment and a computer-generated object, based on the at least one image of the physical environment and the computer-generated object;
while displaying, on the display, environment including the representation of the physical environment and the computer-generated object:
generating a three-dimensional (3D) point cloud characterizing the physical environment; and
obtaining depth information characterizing the physical environment;
detecting, via the input device, a user input defining a capture region that includes a portion of the XR environment, wherein the capture region includes a portion of the physical environment and a portion of the computer-generated object; and
in response to detecting the user input:
selecting a group of points from the 3D point cloud characterizing the physical environment based on the capture region, wherein the group of points satisfies a spatial threshold relative to the capture region;
generating, based on a function of the depth information and the group of points, a volumetric representation of the capture region, wherein the volumetric representation of the capture region includes a volumetric representation of the portion of the physical environment and a volumetric representation of the portion of the computer-generated object, wherein the volumetric representation of the portion of the physical environment is different from the representation of the physical environment, and wherein the volumetric representation of the portion of the computer-generated object is different from the computer-generated object; and
storing the volumetric representation of the capture region in the non-transitory memory.

9. The electronic device of claim 8, wherein the input device corresponds to one of an eye tracking sensor that outputs eye tracking data and an extremity tracking sensor that outputs extremity tracking data, and wherein the capture region is defined by at least one of the eye tracking data or the extremity tracking data.

10. The electronic device of claim 8, wherein the one or more programs further include instructions for:
    modifying the capture region in response to detecting one of a threshold amount of change within the representation of the physical environment or detecting the threshold amount of change with respect to the computer-generated object.

11. The electronic device of claim 8, wherein the one or more programs further include instructions for:
    concurrently displaying, on the display, the XR environment and the volumetric representation of the capture region.

12. The electronic device of claim 11, wherein the one or more programs further include instructions for:
    after displaying the volumetric representation of the capture region, detecting, via the input device, a manipulation input directed to the volumetric representation of the capture region; and
    in response to detecting the manipulation input, changing a viewing perspective of the volumetric representation of the capture region.

13. The electronic device of claim 8, wherein the display corresponds to a see-through display, and wherein the see-through display permits ambient light from the physical environment through the see-through display.

14. A non-transitory computer-readable medium including instructions, which, when executed by an electronic device including one or more processors, an input device, an image sensor, and a display, cause the electronic device to:
    capture, via the image sensor, at least one image of a physical environment;
    generate an extended reality (XR) environment, including a representation of the physical environment and a computer-generated object, based on the at least one image of the physical environment and the computer-generated object;
    while displaying, on the display, the XR environment including the representation of the physical environment and the computer-generated object:
        generate a three-dimensional (3D) point cloud characterizing the physical environment; and
        obtain depth information characterizing the physical environment;
    detect, via the input device, a user input defining a capture region includes a portion of the XR environment, wherein the capture region includes a portion of the physical environment and a portion of the computer-generated object; and
    in response to detecting the user input
        select a group of points from the 3D point cloud characterizing the physical environment based on the capture region, wherein the group of points satisfies a spatial threshold relative to the capture region;
        generate, based on a function of the depth information and the group of points, a volumetric representation of the capture region, wherein the volumetric representation of the capture region includes a volumetric representation of the portion of the physical environment and a volumetric representation of the portion of the computer-generated object, wherein the volumetric representation of the portion of the physical environment is different from the representation of the physical environment, and wherein the volumetric representation of the portion of the computer-generated object is different from the computer-generated object; and
        store the volumetric representation of the capture region.

15. The non-transitory computer-readable medium of claim 14, wherein the input device corresponds to one of an eye tracking sensor that outputs eye tracking data and an extremity tracking sensor that outputs extremity tracking data, and wherein the capture region is defined by at least one of the eye tracking data or the extremity tracking data.

16. The non-transitory computer-readable medium of claim 14, wherein the instructions further cause the electronic device to:
    modifying the capture region in response to detecting one of a threshold amount of change within the representation of the physical environment or detecting the threshold amount of change with respect to the computer-generated object.

17. The non-transitory computer-readable medium of claim 14, wherein the instructions further cause the electronic device to:
    concurrently display, on the display, the XR environment and the volumetric representation of the capture region.

18. The non-transitory computer-readable medium of claim 17, wherein the instructions further cause the electronic device to:
    after displaying the volumetric representation of the capture region, detect, via the input device, a manipulation input directed to the volumetric representation of the capture region; and
    in response to detecting the manipulation input, change a viewing perspective of the volumetric representation of the capture region.

19. The non-transitory computer-readable medium of claim 14, wherein the display corresponds to a see-through display, and wherein the see-through display permits ambient light from the physical environment through the see-through display.

20. The non-transitory computer-readable medium of claim 14, wherein the instructions further cause the electronic device to:
    display, on the display, an editing interface that includes a set of content manipulation affordances for editing the volumetric representation.

* * * * *